(12) United States Patent
De'Longhi

(10) Patent No.: US 7,026,591 B2
(45) Date of Patent: Apr. 11, 2006

(54) DEVICE AND PROCEDURE FOR COOKING A FOOD PRODUCT WITH MICROWAVES

(75) Inventor: Giuseppe De'Longhi, Treviso (IT)

(73) Assignee: De' Longhi S.p.A., Treviso (IT)

( * ) Notice: Subject to any disclaimer, the term of this patent is extended or adjusted under 35 U.S.C. 154(b) by 0 days.

(21) Appl. No.: 10/492,577

(22) PCT Filed: Oct. 10, 2002

(86) PCT No.: PCT/EP02/11342

§ 371 (c)(1),
(2), (4) Date: May 24, 2004

(87) PCT Pub. No.: WO03/032793

PCT Pub. Date: Apr. 24, 2003

(65) Prior Publication Data

US 2004/0250689 A1  Dec. 16, 2004

(30) Foreign Application Priority Data

Oct. 17, 2001 (IT) .......................... MI2001A2147

(51) Int. Cl.
*H05B 6/80* (2006.01)

(52) U.S. Cl. ........................ 219/725; 219/732; 220/253

(58) Field of Classification Search ................ 219/725, 219/726, 734, 730, 728, 732, 745, 751, 762; 99/335, 348; 366/339, 382, 284, 98, 244; 426/107, 109, 113; 220/251, 253, 254.8, 220/259.4, 369, 912

See application file for complete search history.

(56) References Cited

U.S. PATENT DOCUMENTS

| 3,467,804 | A | | 9/1969 | Smith | |
|---|---|---|---|---|---|
| 4,904,834 | A | * | 2/1990 | Bowen | 219/726 |
| 4,959,517 | A | | 9/1990 | Jump | |
| 5,019,680 | A | * | 5/1991 | Morino et al. | 219/730 |
| 5,800,852 | A | | 9/1998 | Levison | |
| 5,863,121 | A | * | 1/1999 | Dunk | 366/285 |

FOREIGN PATENT DOCUMENTS

| DE | 1 190 854 | | 4/1965 |
|---|---|---|---|
| DE | 94 12 341 | | 11/1994 |
| GB | 2322271 A | * | 8/1998 |

\* cited by examiner

*Primary Examiner*—Quang Van
(74) *Attorney, Agent, or Firm*—Herbert Dubno

(57) ABSTRACT

A utensil for cooking pasta in a microwave oven has an upstanding tubular central portion through which a drive shaft extends of a mixing member which fits over that central tubular portion and extends downwardly in the utensil. The drive shaft is driven by a motor in the microwave oven or a motor forming part of the utensil.

9 Claims, 5 Drawing Sheets

DEVICE AND PROCEDURE FOR COOKING A FOOD PRODUCT WITH MICROWAVES

CROSS REFERENCE TO RELATED APPLICATIONS

This application is a national stage of PCT/EP02/1134 filed 10 Oct. 2002 and based upon Italian national application MIOPA002147 of 17 Oct. 2001 under the International Convention.

FIELD OF THE INVENTION

The present invention relates to a device and a procedure for cooking a food product with microwaves.

BACKGROUND OF THE INVENTION

Current microwave ovens can a rotary plate in the cooking chamber to make the cooking of the food product homogeneous.

In order to further improve the cooking of the food product some ovens are also equipped with electrical resistances which operate in combination with the microwaves. Currently, therefore, microwaves are capable of effectively cooking almost all food products commonly in use in a totally equivalent way to traditional cooking in an electric or gas oven.

However, none of the current microwave ovens is capable of cooking food products which are normally cooked in liquids, such as pasta, polenta, etc., or heating chocolate, or any type of deep-fat frying.

In other words these microwaves, even the most sophisticated and expensive, are not able to cook food products which normally are cooked with a pan placed upon a hob on a traditional gas stove.

In the case of rice, in some countries so-called "rice-cookers" are known and are used to cook rice and to keep it hot for it then to be seasoned or served as an accompaniment for other food.

OBJECTS OF THE INVENTION

An object of the present invention is to eliminate the aforementioned drawbacks of the prior art and to provide a device and a method for cooking a food product with microwaves which allow microwave ovens to cook any food product which currently is cooked in an oven and/or on the hob.

Another object is to provide a device and method for cooking a food product in liquid with microwaves, be the liquid water, milk, oil or some other liquid for cooking pasta, rice, fruit, cream and the like.

A further object of the invention is to provide a device and a method which allow any food product in a liquid to be cooked in an optimal manner or better than with respect to traditional cooking.

Also an object of the invention is to provide a device and a method which allow flexibility of delivery of microwaves since they can be dosed and delivered in any way according to the type of food product to be cooked, the amount thereof and the state of the liquid, for example, hot or cold water.

Finally, an object of the invent is to provide a device and a method which facilitates the cooking in any liquid of any food product, since the user enters an easily measured amount of liquid into the container and, having inputted the time required by the conventional system and the initial state of the liquid (hot or cold), the cooking requires no manual intervention.

SUMMARY OF THE INVENTION

These objects are attained in accordance with the present invention with a device for cooking a food product with microwaves which comprises a container for the food product with microwaves which comprises a container for the food product to be cooked in a liquid and means for displacing said food product in said liquid inside said container, said container and said displacement means being made from material suitable for being used in the presence of device fob cooking microwaves.

The present invention also comprises a method of cooking a food product with microwaves. The method consists of putting the food product in a liquid, possibly with other ingredients, setting the microwave cooking time in said liquid and mixing the food product in the liquid.

SPECIFIC DESCRIPTION

Figure 1:
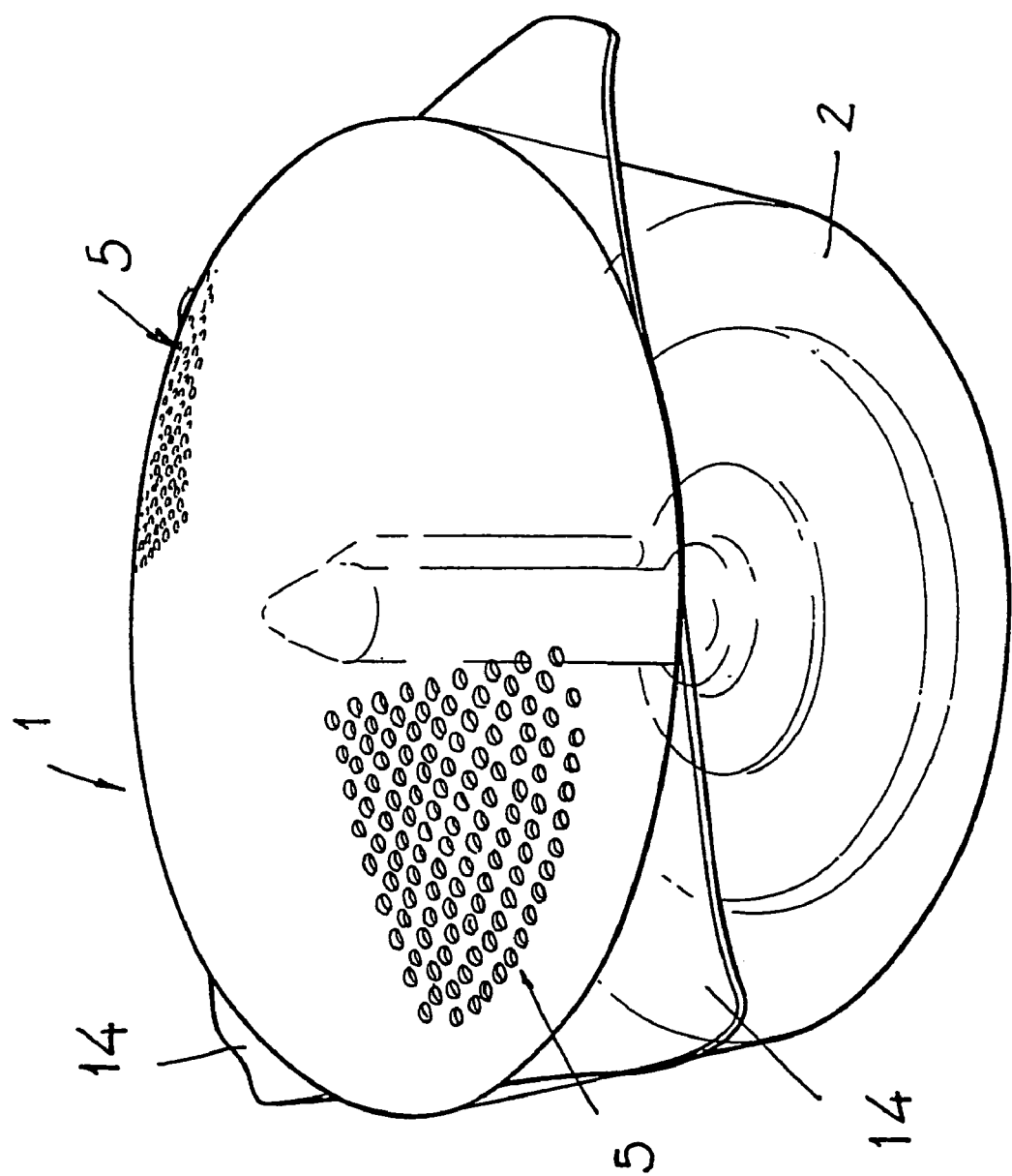
FIG. 1 is a perspective view of the device according to the invention.

The device 1 comprises a container 2 for the food product to be cooked and means 3 for displacing the food product inside the container. In an appropriate manner, the container 2 and the displacement means 3 are made from a material suitable for being used in the presence of microwaves.

The container is equipped with markings, notches, ridges or other elements used to identify the liquid levels for the various amounts of product to be cooked, thus facilitating preparations for cooking. Such markings or elements representing the levels are visualzed by the control system on the display in the step of setting the cooking time, since this is necessary data for automatic control to determine the cooking procedure.

Moreover, the device 1 comprises a cover 4 for closing the container 2, also made from material suitable for being used in the presence of microwaves and, preferably, made from the same material as the container 2.

The cover 4 has a plurality of holes 5 smaller in size than the food product to be cooked, arranged on the cover 4 in a greater number towards the container 2 and in a lesser number on the side opposite said container 2.

The holes allow the water to be drained in the case of the cooking of pasta or the like.

The orientation of the holes is' at 90 angular degrees with respect to the handles: this provision allows the leftover water to be drained without scalding the users hands with steam.

On the cover a further opening, not represented, is also formed, facing towards the user, which allows him to check how much the food is cooked.

Both types of opening, i.e. the small holes and the big one, can be equipped with a closing partition (or diaphragm, or cover), fixed so as to be able to be opened or lifted manually, for the generation of steam inside the container or when the container itself is tilted to drain the water at the end of cooking. In such a way, a faster increase in the temperature of the water is obtained, and still the formation and release of foam during cooking reduces, since the raising of the partition increases the heat exchange between boiling water and the air around it, and the evaporation is made easier.

Moreover, the cover 4 and the container 2 comprise connection means 6 for them to be joined together.

In a preferred solution, the displacement means 3 comprises at least one mixing member 7 housed inside the container 2 and at least one drive member 8 to activate the mixing member 7 and/or the container 2, in this case keeping the mixing member still (in an alternative embodiment).

Figure 2:
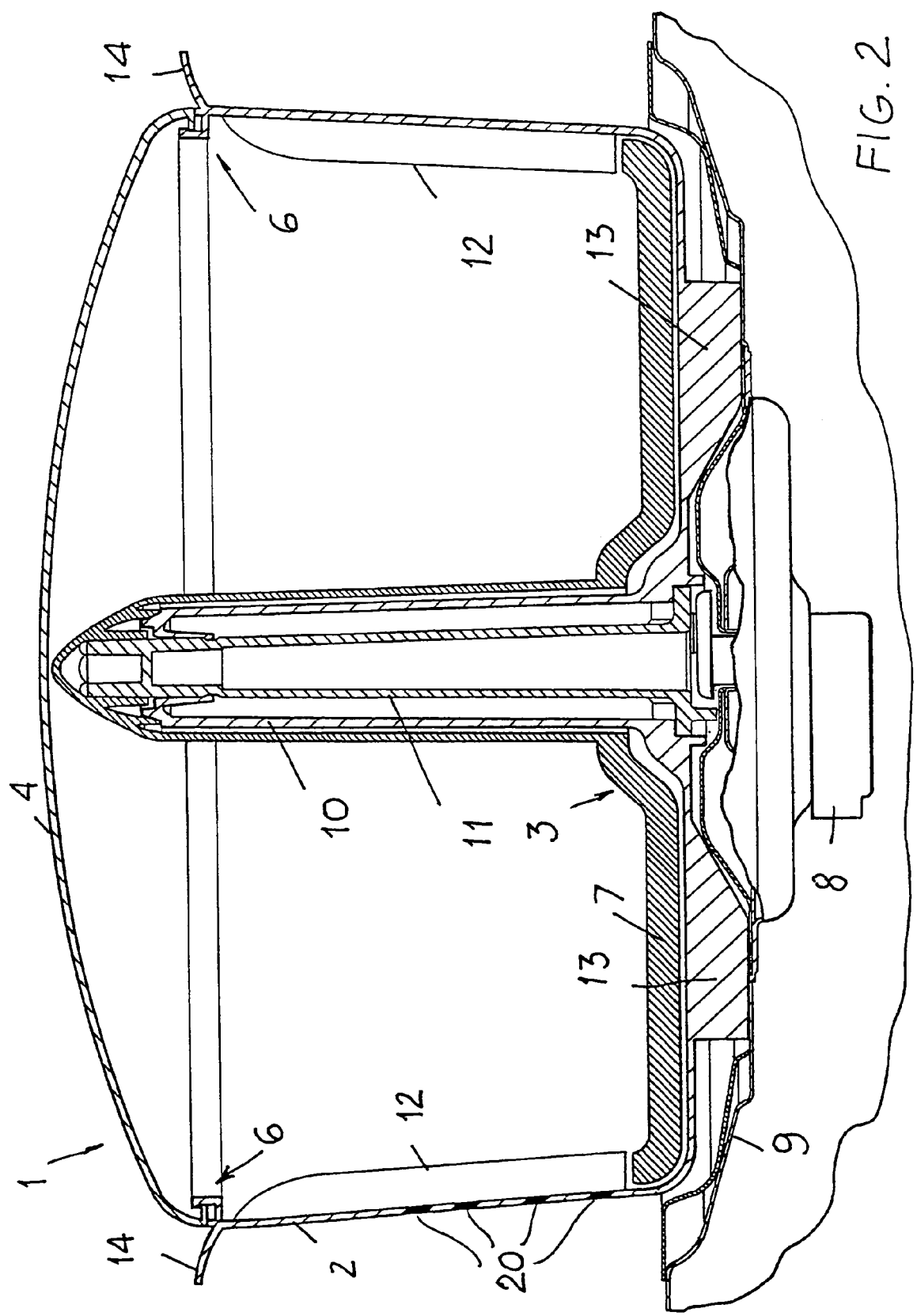
FIG. 2 is a cross section of the device associated with a base portion of a microwave oven.
Figure 3:
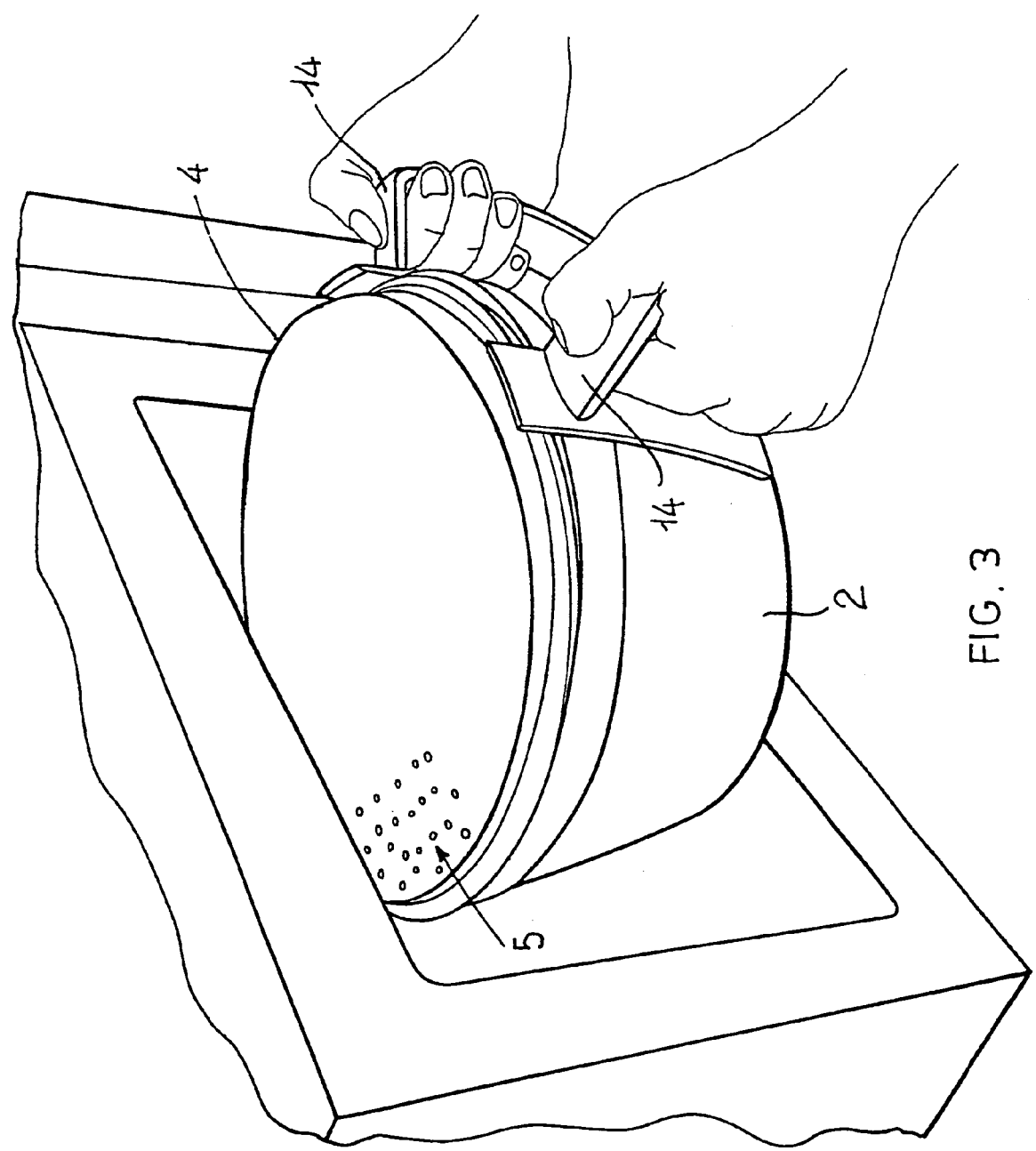
FIGS. 3 and 4 are perspective views showing a preferred solution embodiment arrangement of handles for moving the device.
Figure 4:
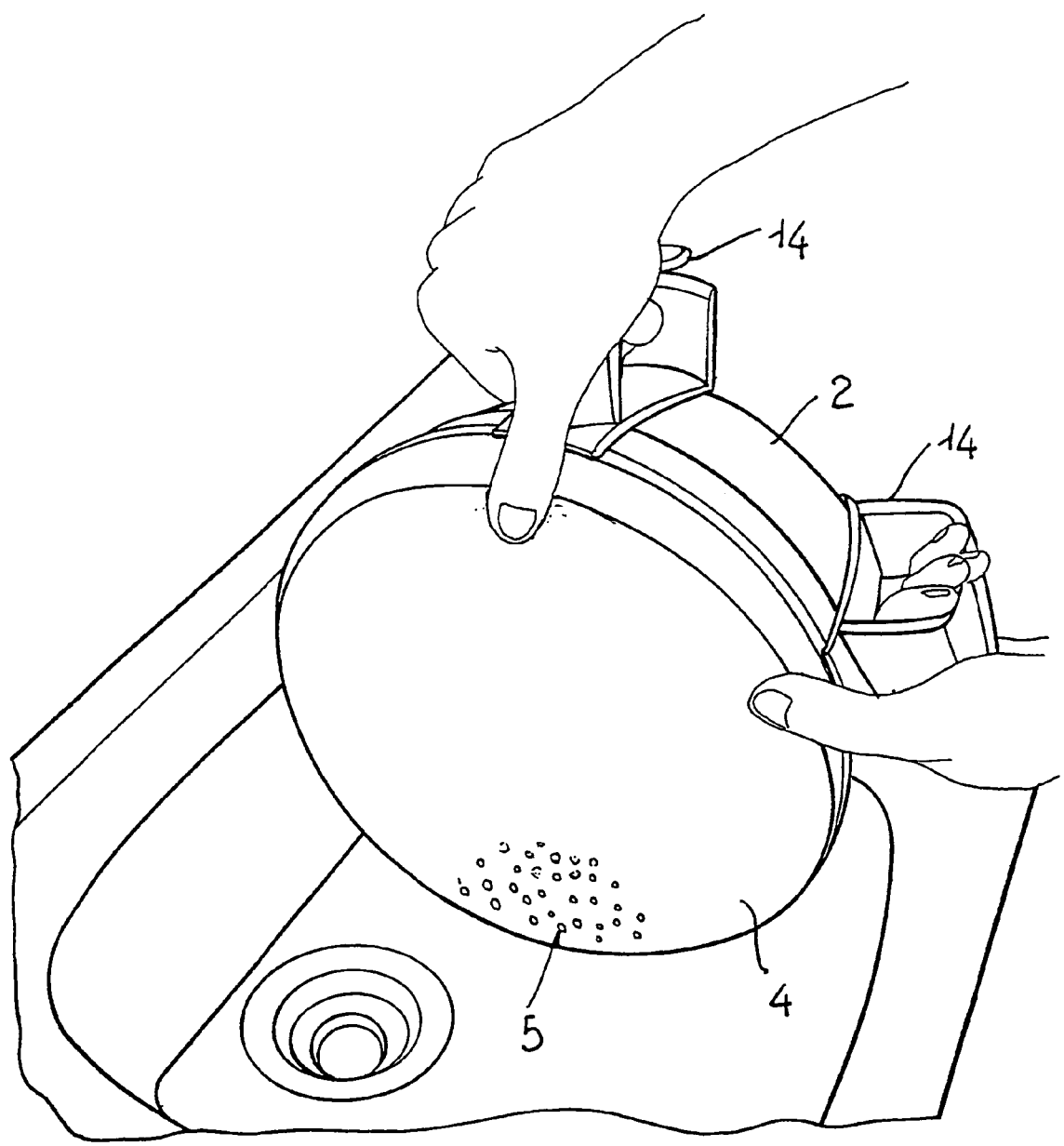

In a first embodiment, FIG. 2, the drive member 8 is housed in the base 9 of the cooking area of a microwave oven and has an operation which is dependent upon the oven.

In this case, the drive member 8 is the same one which makes the plate of the microwave oven rotate; preferably (as shown in the attached figures) the plate is removed to house the device according to the invention.

In particular, in such an embodiment, the container 2 has a central tubular element 10, inside which a connection shaft 11 is provided between the drive member 8 of the oven and the mixing member 7.

Figure 5:
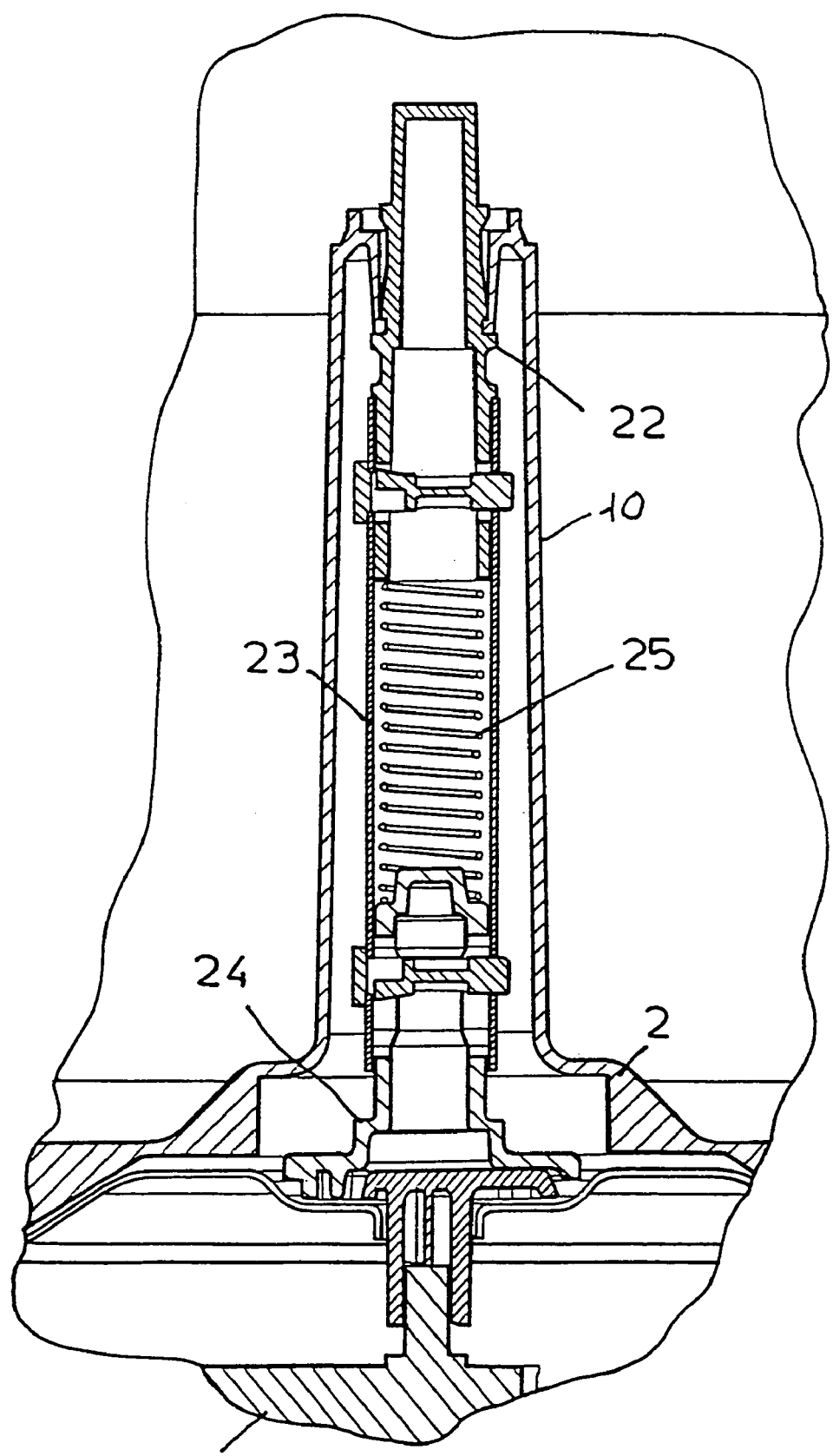
FIG. 5 is an enlarged section view of the connection shaft according to a preferred embodiment.

In a preferred construction which can be seen in FIG. 5, the connection shaft 11 can consist of at least three parts: an upper joint 22, a central portion 23 and a lower member 24 for fitting to the drive member 8.

In order to ease the coupling between the fitting member 24 and the drive member 8 (the coupling can indeed be difficult since the user cannot see if the connection shaft has engaged correctly in the tabs for driving the drive member: this is due to the special construction of the container, equipped with a central tubular element 10 which hides the attachment of the drive member 8 from the user), the connection shaft 11 can have elastic elements 25 for compensating the clearance which exists until the fitting member 24 engages regularly in the drive member 8.

The elastic elements can be made from material suitable for being used in the presence of microwaves or else can consist of a metallic spring: in this case the central portion 23 shall also be metallic so as to offer suitable screening of the elastic element with respect to the microwave energy (indeed, due to the special shape, no flush spring can be used in the presence of microwaves without causing overheating or electrical discharges).

The mixing member 7 is preferably removable and has a configuration and a structure according to the type of food product to be cooked.

For the above, in a preferred embodiment, at least one portion of the mixing member 7 is elastically yielding. The container 2 has ribs 12 suitable for cooperating with the mixing member 7, to mix the food product.

The ribs can just be present on the wall of the container or else also on the tubular element.

The container 2 also has anti-rotation elements 13 to prevent its rotation about its axis during operation.

Moreover, the container 2 also has marker elements 20, such as notches, for the correct dosage of the ingredients for cooking the food product, be it pasta, rice, polenta, custard or other.

The container 2 and the cover 4 preferably have at least one handle and in particular two handles 14.

The handles 14 are positioned so as to make it easy for the user to grip them and so as to avoid the risk of scalding in the case of contact with the hot walls of the cooking space: once the device is positioned in the oven, the handles shall be in front of the user, conveniently facing towards the door• and far from the side walls.

In a constructive variant, in the case in which the microwave oven does not have a rotary plate and, therefore, is without the motor 8, the container 2 can receive a motor totally made from material compatible with microwaves of the manual loading removable type.

In this case the autonomy of the motor would be limited to the cooking of the food product.

The present invention also refers to a procedure for cooking food product with microwaves.

The procedure consists of placing the food product in a liquid possibly adding other ingredients, setting the microwave cooking time in the liquid and mixing the food product.

More precisely, the microwave oven can be equipped with devices for controlling the delivery of microwaves and with the mixing member 7, operating according to the information set by the user.

For example, in the case of cooking pasta, the user can set the level of the water inserted in the device and the time shown on the packaging. The control devices shall take care of precisely determining the duration of the delivery of microwaves and the mixing functions, so as not to ruin (with too vigorous mechanical action on a load which is still hard) or overcook the pasta.

It must be noted that the control device, the use of which in microwave ovens is already known, in this case constitutes an exclusive integrated cooking management system for food by immersion in liquid and microwave heating (like, for example, pasta).

Preferably, the step of mixing the product happens at the same time as or after the cooking with microwaves according to the type of food product.

Moreover, the delivery of microwaves during the cooking of the food product can be adjusted according to the amount of liquid, the product and their starting condition, in a continuous or cyclical manner.

In this case, for example, the container 2 can validly replace a conventional rice-cooker.

In practice, when for example pasta is cooked, cold or hot water, salt and raw pasta are inserted into the container 2 in the determined amounts.

The container 2, with the cover 4 closed, is inserted into the oven and then the magnetron is activated for a predetermined time to carry out the cooking.

In this way the raw pasta shall be subjected to two combined and simultaneous heating actions: the heating offered by radiation of microwaves (which act directly on the pasta) and the heating offered by conduction of the water in which the pasta is immersed.

The cooking of the pasta thus begins immediately, allowing the total cooking time to be reduced. Indeed, it is not necessary to wait for a rise in temperature of the water up to boiling as takes place in conventional cooking.

During cooking the mixing member 7 mixes the food product and guarantees its optimal and uniform cooking.

Moreover, the mixing action can prevent the food, like for example pasta, from clumping together and sticking.

In practice, it has been noted how the device and a procedure for cooking a food product with microwaves according to the invention are particularly advantageous because they allow various types of food products to be cooked in an optimal manner.

For example, the device and procedure according to the invention can optimally cook pasta and boiled food, polenta, chocolate, rice, etc.

Moreover, it is possible to equip the container with mechanical elements or other types of elements, suitable for actuating a separate element, forming part of the oven, which is connected with the control part of the apparatus, and which is capable of indicating the presence of the accessory in the cooking area of the oven itself. Such elements, in a preferred but not exclusive solution, can be projections, protuberances or particular profiles of the surface (e.g. the side and the base, indicated in FIG. 2 with reference numeral 13) of the container (identified in FIG. 2 with reference numeral 2) which are suitable for actuating leverages, buttons, switches or any other sensor which transmits the information on the presence of the container to the oven control system. Another embodiment foresees the use of electronic, optical, piezoelectric or magnetic sensors, always with the function of detecting the introduction of the container into the cooking area of the oven. The function of the system for detecting the presence of the container can be multiple: a specific program for the operation of the oven, e.g. the microwave cooking with determined power, is activated; the activation of the conventional heating elements, which could damage the container and its internal components (mixing system) is prevented; a heat supervision system of all of the apparatus is activated to avoid overheating or fire in the case. of improper use of the cooking accessory. The described functions are examples, they can be implemented individually or together, and the list mentioned does not exclude the possibility of use of the possible system for detecting the presence of the accessory. The device and procedure for cooking a food product with microwaves thus conceived are susceptible to numerous modifications and variants, all covered by the inventive concept; moreover, all of the details can be replaced with technically equivalent elements.

In practice, the materials used, as well as the sizes, can be whatever according to the requirements and the state of the art.

The invention claimed is:

1. A device for cooking a pasta product in a microwave oven, comprising:
    a microwave compatible container having a generally flat bottom, a peripheral wall rising substantially perpendicular to said bottom, a cover removably fitted onto said wall at an upper edge thereof, and a tubular central element rising upwardly from said bottom to substantially a top of said container of at a center thereof and open downwardly at said bottom;
    a microwave compatible mixing member in said container rotatable about said central tubular element and having a portion surrounding said central tubular element extending downwardly all along said central tubular element from a top thereof to at least a liquid level in said container; and
    a microwave compatible drive member extending upwardly within said central tubular element, coupled to said portion of said mixing member at a top of said central tubular element, and connectable with a motor below said bottom of said container for rotating said mixing member and enabling the mixing of contents of said container during preparation of pasta therein.

2. The device defined in claim 1 wherein said cover has a plurality of holes for draining liquid from the interior of said container, said holes being in a greater number toward an edge of said cover and a lesser number away from the edge of said cover, said cover and said upper edge of said wall being provided with connection means for joining said cover detachably to said wall.

3. The device defined in claim 2 wherein said motor is attached to said container.

4. The device defined in claim 2 wherein said mixing member has a disk shaped portion overlying said bottom and connected to the portion surrounding said additional tubular element.

5. The device defined in claim 4 wherein said container has at least one rib cooperating with said mixing member for mixing the contents of said container during preparation of pasta therein.

6. The device defined in claim 5 wherein said container is provided with markings indicating correct amounts of liquid for cooking pasta in said liquid in said container.

7. The device defined in claim 6, further comprising two handles formed on said container enabling the removal of said container from and insertion of said container into said oven, and draining of liquid from said container.

8. The device defined in claim 1 wherein said motor forms part of said microwave oven and is coupled to said drive member upon insertion of said container in said oven.

9. The device defined in claim 1 wherein said driving member is a connection shaft having an upper joint connected to said portion of said mixing member, a central portion of said shaft, and a lower portion of said shaft, springs being provided between said upper portion and said withdrawal portion and said central portion and said lower portion of said shaft.

* * * * *